July 18, 1950 E. WILD 2,515,622
FOLDABLE RULE
Filed May 24, 1947
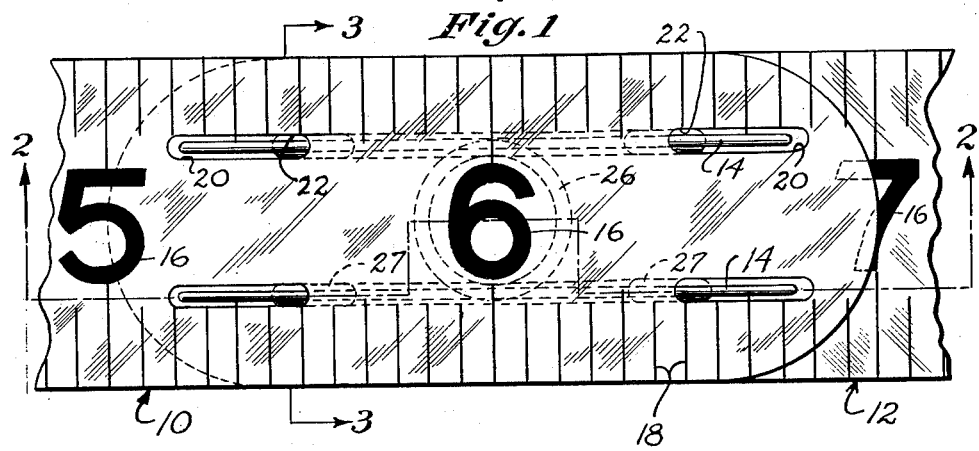
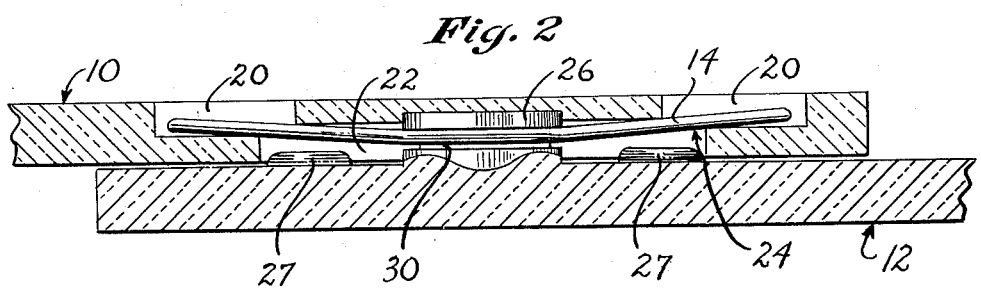
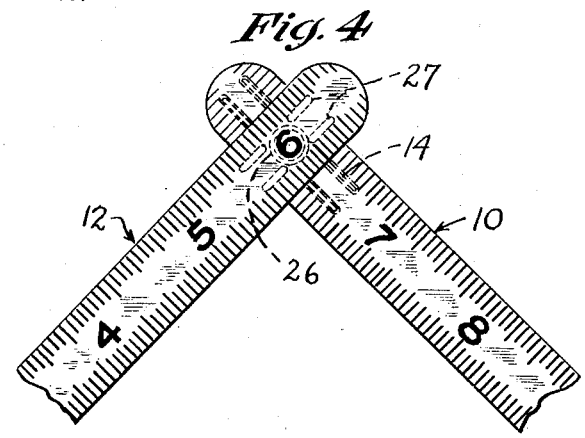
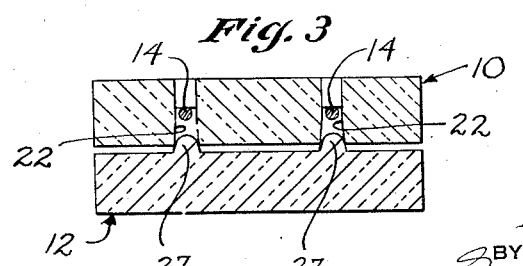
INVENTOR
Edward Wild
BY
Gifford J. Holmes
AGENT Patented July 18, 1950

2,515,622

UNITED STATES PATENT OFFICE 2,515,622

FOLDABLE RULE

Edward Wild, Hartford, Conn.

Application May 24, 1947, Serial No. 750,295

10 Claims. (Cl. 33—120)

This invention relates to improved spring lock joints generaly; and more specifically to foldable rules, or the like, incorporating one or more yieldable lock joints.

The invention is characterized in having relatively rotatable male and female parts, with grooves arranged upon said parts so as to receive a spring, which spring performs the dual function of locking the parts together but being yieldable to permit relative movement between the parts.

The structure is such that smooth exterior surfaces are provided upon both sides of the rule adjacent the point of rotation thereof, whereby clearly legible indicia may be placed at such point and the graduation lines may extend fully to the edge of the rule to facilitate a ready and accurate reading thereof.

Rules used heretofore have generally incorporated clips, or similar structure, adjacent the point of rotation, which clips have obscured both indicia and graduations to render reading of the rule inaccurate. Further, such rules require several parts and operations in fabrication which adds to cost and multiplies the chances for breakage or loosening of a part during use to render the rule inaccurate.

Accordingly, it is an object of this invention to provide a rotatable spring lock joint comprising a minimum of parts, namely a pair of relatively rotatable parts forming a pivot, and a lock spring.

A further object is to provide a joint as set forth in the preceding paragraphs wherein position maintaining detents are arranged in predetermined relationship between the parts.

Another object is to provide a foldable rule with parts arranged and joined so as to render the edges of the rule adjacent a joint free of joint structural parts and with edges of all sections, when in open position, extending in alignment with each other.

Other objects and advantages reside in the details of construction whereby an improved foldable rule, or the like, can be fabricated from few parts which require a minimum of operations in manufacture and obtain a rugged product. Such objects and advantages will be either obvious or pointed out in the following specification.

In the drawing:

Fig. 1 is a plan view of my improved joint incorporated into a folding rule.

Fig. 2 is a sectional view taken on the planes of the broken line 2—2 of Fig. 1.

Fig. 3 is a sectional view taken on the line 3—3 of Fig. 1.

Fig. 4 is a smaller scaled view of the bottom of the rule with the parts in a transient state.

Referring more in detail to the drawing, and first to Fig. 1, a rule comprises a first part 10 and a second part 12 joined together by springs 14 in a manner to be described more fully hereinafter. The rule parts 10 and 12 may carry indicia 16 such as used upon a folding rule which is pivoted every six inches, for example, and may carry similar indicia on the bottom which may start from the opposite end of the rule for convenience to the user. Graduation marks 18 are provided in conjunction with the indicia 16 in a conventional manner to divide inches into fractions of inches, for example. It is to be understood that for different units of measurement, for instance the metric system, different graduations than shown may be most desirable.

As best shown in the sectional views (Fig. 2 and Fig. 3) the springs, at least one of which is required, lie in grooves 20 opening into the upper surface of the member 10 and grooves 22 opening on the lower surface of the member 10. The grooves 20 and 22 join each other at a position 24 to permit passage of the springs 14 through the grooves. The groove 22 may have sloping sides, as best shown in Fig. 3 for a purpose to be hereinafter more fully described as well as for the purpose of facilitating removal from a mold when the part 10 is formed of molded plastic material, for example. It is to be understood however that the joint may be fabricated of any material suitable for the use to which it is to be put, such as metal, wood, glass, etc.

The lower part 12 is provided with a short cylindrical member or boss 26 that may fit into a hole sized to fit the same in the upper member 10. This boss 26 at an intermediate point in its height has formed therein an annular groove. The lower member 12 is also provided with detents 27 that fit into the lower grooves 22 on the upper member 10 and are biased thereinto by the springs 14.

To assemble this rule, the part 12 may be placed upon a suitable work surface and the part 10 laid thereon with the boss 26 within the hole in the upper member 10 and the detents 27 engaging the lower grooves 22 in the member 10. The springs 14 may then be inserted into the holes 20 and therethrough into the grooves 22, into the sides of the circumferential groove 30 in the boss 26, through the remainder of the groove 22 and into the other groove 20. As best shown in Fig. 2, the springs 14 bias the upper member 10 downwardly and the boss 26 of the lower member 12 upwardly. Such bias will cause the detents 27 to snugly engage the groove 22 to provide a rigidity of the assembled structure predetermined by the tension of the spring 14, which tension may be controlled by the gage of spring wire or by the amount of bow in the wire, for example. The engagement of the springs 14 within the groove 30 of the boss 26 serves also to retain the members 10 and 12 in assembled position and prevents their separation.

In use of the rule, such as in folding, the parts 10 and 12 may be rotated upon the boss 26 and the sloped surfaces of the grooves 22 and the detents 27 will cause the springs 14 to flex still further than shown in Fig. 2 and the part 10 will ride upon the detents 27 until such time as they engage the groove 22 again. In the structure shown, such positions will be 180° apart. However, it is to be understood that if positions at other degrees in rotation are desired, other detents may be provided upon the member 12 or other grooves upon the member 10 as preferred, to accommodate for locking the rule in other positions. Such other detents are not shown because they are deemed to be obvious, but might find application in different drawing and measuring instruments than a foldable rule such as described herein.

If it is desired to have absolutely smooth upper and lower outer surfaces of the rule, the groove 20 may be filled in with a plastic, for example of material similar to that of which the rule is comprised.

It will be apparent from the description above that I have provided an improved spring lock joint and rule, the sections of which may be made of plastic material that may be either transparent, translucent or opaque as desired. The parts may be very conveniently molded by any of several well known processes, printed with indicia, which operation can also be performed in the mold in some processes, and the two parts put together by leaf springs 14, which operation may be a simple cut off and insertion operation as is well known in the art. Obviously many other uses and some modification for the joint will occur to those skilled in the art. For this reason I wish not to be limited in my invention only to the specific modification shown and described but by the spirit and scope of the appended claims.

I claim:

1. A spring lock pivot joint comprising, in combination, first and second parts, a pivot formed by a grooved boss on one of said parts and a recess for receiving said boss formed within the second of said parts, said second part having pairs of communicating grooves forming pairs of shoulders, two of the grooves connecting with the recess and opening on the side of said second part facing said first part, a pair of springs positioned individually within said groove and engaging said shoulders and an edge of the groove in said boss for yieldably biasing said first and second parts together, and detents carried on the side of said first part facing said second part and spaced to engage said recess connecting grooves.

2. A spring lock pivot joint comprising, in combination, first and second parts, a pivot formed by a grooved boss on one of said parts and a recess for receiving said boss formed within the second of said parts, said second part having pairs of communicating grooves forming pairs of shoulders, two of the grooves connecting with the recess, and a pair of springs positioned individually within said grooves and engaging said shoulders and an edge of the groove on opposite sides of said boss for yieldably biasing said first and second parts together.

3. A spring lock pivot joint comprising, in combination, first and second parts, a pivot formed by a grooved boss on one of said parts and a recess for receiving said boss formed within the second of said parts, said second part having communicating grooves forming shoulders, at least one of the grooves connecting with the recess, and a wire spring within one of said grooves engaging said shoulders and an edge of the groove in said boss for yieldably biasing said first and second parts together.

4. A spring lock pivot joint comprising, in combination, first and second parts, a pivot formed by a circumferentially grooved boss on one of said parts and a recess for receiving said boss and recess joining grooves forming shoulders formed in the other of said parts, at least one of the grooves connecting with the recess, and a wire spring within one of said grooves engaging said shoulders and an edge of the groove in said boss for yieldably biasing said first and second parts together.

5. In a folding tool, in combination, first and second rotatable parts, a pivot formed by a grooved boss on one of said parts and a recess for receiving said boss formed within the second of said parts, said second part having grooves communicating with each other to form shoulders, at least one of the grooves connecting with the recess and opening on the side of said second part facing said first part, a wire spring within one of said grooves engaging said shoulders and an edge of the groove in said boss for yieldably biasing said first and second parts together, and detents on said first part on the side facing said second part and being spaced to engage said recess connecting groove.

6. In a folding rule, in combination, first and second parts having indicia, a pivot formed by a circumferentially grooved boss on one of said parts and a recess for receiving said boss formed within the second of said parts, said second part having pairs of mutually communicating grooves forming shoulders, two of the grooves connecting with the recess, and a pair of springs positioned individually within said grooves and engaging said shoulders and opposite sides of an edge of the groove in said boss for yieldably biasing said first and second parts together.

7. In a folding rule, in combination, first and second parts having indicia thereon, a pivot formed by an integral boss having a shoulder on one of said parts and a recess for receiving said boss formed within the other of said parts, said second part having openings forming shoulders, at least one of the openings connecting with the recess, and a spring engaging all of said shoulders for yieldably biasing said first and second parts together.

8. In a folding rule, in combination, first and second transparent parts, a pivot formed by a grooved boss on one of said parts and a recess for receiving said boss formed within the second of said parts, said second part having communicating grooves forming pairs of shoulders, two of the grooves connecting with the recess, leaf springs engaging said pairs of shoulders and spaced points upon an edge of the groove in said boss for yieldably biasing said first and second parts together, and a detent upon said one of said parts for engaging at least one of said grooves when said first and second parts are in a predetermined position relative to each other.

9. In a folding tool, in combination, first and second rotatable parts, a pivot formed by an integral grooved boss on one of said parts and a recess for receiving said boss formed within the second of said parts, said second part having grooves forming shoulders, at least one of the grooves connecting with the recess containing said boss, and a spring positioned within said groove and engaging said shoulders and an edge of the groove in said boss for yieldably biasing said first and second parts together.

10. In a folding tool, in combination, first and second parts having indicia, a pivot formed by an integral boss having a shoulder on one of said parts and a recess for receiving said boss formed within the other of said parts, said second part having openings forming shoulders, at least one of the openings connecting with the recess, a spring positioned within said opening and engaging said shoulders for yieldably biasing said first and second parts together, and a detent upon said one of said parts for engaging at least one of said openings when said first and second parts are in a predetermined position relative to each other.

EDWARD WILD.

REFERENCES CITED

The following references are of record in the file of this patent:

UNITED STATES PATENTS

| Number | Name | Date |
|---|---|---|
| 1,211,458 | Leavens | Jan. 9, 1917 |
| 1,293,079 | Gasstrom et al. | Feb. 4, 1919 |
| 1,690,071 | Hoerle | Oct. 30, 1928 |
| 2,365,735 | Ware | Dec. 26, 1944 |

FOREIGN PATENTS

| Number | Country | Date |
|---|---|---|
| 362,912 | Germany | Nov. 2, 1922 |